United States Patent
Steiner

(10) Patent No.: US 11,278,984 B2
(45) Date of Patent: Mar. 22, 2022

(54) POWER SUPPLY SYSTEM FOR A MOBILE RESISTANCE WELDING MACHINE

(71) Applicant: Plasser & Theurer Export von Bahnbaumaschinen Gesellschaft m.b.H., Vienna (AT)

(72) Inventor: Ronald Steiner, Rabenstein an der Pielach (AT)

(73) Assignee: Plasser & Theurer Export von Bahnbaumaschinen Gesellschaft m.b.H., Vienna (AT)

(*) Notice: Subject to any disclaimer, the term of this patent is extended or adjusted under 35 U.S.C. 154(b) by 662 days.

(21) Appl. No.: 15/768,096

(22) PCT Filed: Oct. 27, 2016

(86) PCT No.: PCT/EP2016/001789
§ 371 (c)(1),
(2) Date: Apr. 13, 2018

(87) PCT Pub. No.: WO2017/088946
PCT Pub. Date: Jun. 1, 2017

(65) Prior Publication Data
US 2018/0304398 A1    Oct. 25, 2018

(30) Foreign Application Priority Data
Nov. 27, 2015    (AT) .................. A 767/2015

(51) Int. Cl.
*B23K 11/24*    (2006.01)
*H02J 3/32*    (2006.01)
*B23K 9/10*    (2006.01)

(52) U.S. Cl.
CPC .......... *B23K 11/248* (2013.01); *B23K 9/1075* (2013.01); *H02J 3/32* (2013.01); *B23K 11/246* (2013.01)

(58) Field of Classification Search
CPC .. B23K 11/246; B23K 11/248; B23K 9/1075; G01C 3/085; G01S 17/48; H02J 3/32
(Continued)

(56) References Cited

U.S. PATENT DOCUMENTS 4,159,408 A      6/1979  Lifshits et al.
2005/0263514 A1*  12/2005  Albrecht .............. B23K 9/1006
                                                              219/133
(Continued)

FOREIGN PATENT DOCUMENTS

DE     2804727 A1    8/1978
DE    19953238 A1    5/2001
(Continued)

OTHER PUBLICATIONS

International Search Report of PCT/EP2016/001789, dated Feb. 22, 2017.

*Primary Examiner* — Tu B Hoang
*Assistant Examiner* — Vy T Nguyen
(74) *Attorney, Agent, or Firm* — Collard & Roe, P.C.

(57) ABSTRACT

The invention relates to an energy supply system for a mobile resistance welding machine for flash-butt welding of track rails, comprising a combustion engine (1) coupled to a generator (2) as well as a charging device (5) for charging an energy store (7), wherein the energy store (7) is a buffer element of an intermediate circuit (13) to which a welding inverter (14) is connected. In this, the energy supply system comprises an island grid to which the generator (2) is connected and which is coupled to the intermediate circuit (13) by a controlled power converter (16).

9 Claims, 1 Drawing Sheet

(58) Field of Classification Search
USPC ........ 219/110, 97, 101, 130.1–5, 137.7, 133, 219/108; 320/107; 363/157; 323/360; 180/53.5
See application file for complete search history.

(56) References Cited

U.S. PATENT DOCUMENTS

| | | | | |
|---|---|---|---|---|
| 2007/0102405 A1* | 5/2007 | Prinz | ...................... | B23K 9/093 219/130.4 |
| 2007/0181547 A1* | 8/2007 | Vogel | ................... | B23K 9/1081 219/130.1 |
| 2007/0278993 A1* | 12/2007 | Vogel | ...................... | H02J 7/007 320/107 |
| 2010/0193489 A1* | 8/2010 | Beeson | ................ | B23K 9/1056 219/133 |
| 2010/0314181 A1* | 12/2010 | Beeson | .................. | B60K 25/02 180/53.5 |
| 2011/0006046 A1* | 1/2011 | Albrecht | .............. | B23K 9/1006 219/133 |
| 2011/0114607 A1* | 5/2011 | Albrecht | .............. | B23K 9/1006 219/108 |
| 2012/0074116 A1* | 3/2012 | Matthews | ............ | B23K 9/1081 219/133 |
| 2014/0263238 A1* | 9/2014 | Ulrich | .................. | B23K 9/1012 219/130.21 |

FOREIGN PATENT DOCUMENTS

| | | |
|---|---|---|
| DE | 102013014666 A1 | 12/2014 |
| JP | 2006026679 A | 2/2006 |

\* cited by examiner

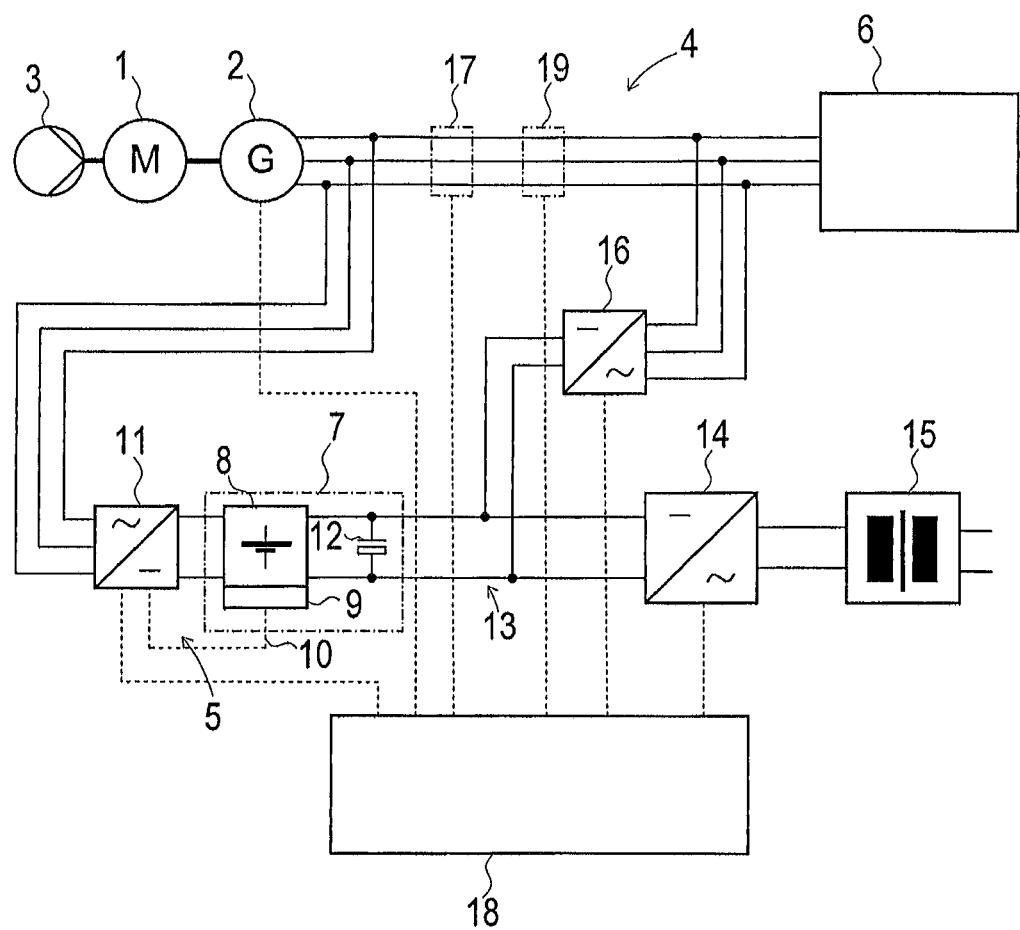

POWER SUPPLY SYSTEM FOR A MOBILE RESISTANCE WELDING MACHINE

CROSS REFERENCE TO RELATED APPLICATIONS

This application is the National Stage of PCT/EP2016/001789 filed on Oct. 27, 2016, which claims priority under 35 U.S.C. § 119 of Austrian Application No. A 767/2015 filed on Nov. 27, 2015, the disclosures of which are incorporated by reference. The international application under PCT article 21(2) was not published in English.

TECHNICAL FIELD

The invention relates to an energy supply system for a mobile resistance welding machine for flash-butt welding of track rails, comprising a combustion engine coupled to a generator as well as a charging device for charging an energy store, wherein the energy store is a buffer element of an intermediate circuit to which a welding inverter is connected.

PRIOR ART

A simple energy supply system for a mobile resistance welding machine for flash-butt welding of track rails is known from EP 0 461 575 A2. In this, electrical energy for supplying a welding inverter is provided by means of a generator arranged in the welding machine. As is well known, an assembly for flash-butt welding comprises two assembly blocks, each having a pair of clamping- and welding jaws. These assembly blocks are displaceable with respect to one another in the longitudinal direction of the rail by means of hydraulic cylinders. Therefore, a hydraulic pump arranged in the welding machine is provided for actuation of the hydraulic cylinders.

In order to reduce the power requirements of a mobile resistance welding machine, DE 28 04 727 A1 describes an energy supply system of the specified type, having an accumulator. This accumulator is charged during a welding pause and covers the energy peaks during a welding operation. Thus, a smaller diesel power unit can be used because the same does not have to provide the required welding energy immediately during a welding operation.

SUMMARY OF THE INVENTION

It is the object of the invention to further develop the energy supply systems known from the prior art. In addition, a corresponding method for operation of an energy supply system shall be shown.

According to the invention, this object is achieved with an energy supply system according to claim 1 and a method according to claim 9. Advantageous further developments can be gathered from dependent claims.

In this, it is provided that the energy supply system comprises an island grid to which the generator is connected and which is coupled to the intermediate circuit by means of a controlled power converter. In this manner, a flexibly operable energy supply system is indicated by means of which—independently of a charging operation of the energy store—energy can be exchanged, if needed, between the intermediate circuit and the island grid.

In addition to the charging device, the power converter is arranged as a further system component in order to provide energy from the energy store for users in the island grid, if necessary. If a welding pause is too short for charging the accumulator, the power converter also creates the possibility to feed additional energy from the island grid to the intermediate circuit. Thus, the energy supply system can be used for various application scenarios of the resistance welding machine.

In an advantageous further development, the energy store comprises a lithium-ion accumulator. This type of accumulator has the required high specific energy to cover the energy peaks during a flash-butt welding operation and to support the island grid by means of the power converter, if necessary.

In this, it is favourable if the lithium-ion accumulator is designed as an accu-pack having an integrated charging circuit for carrying out battery management. This enables a simple integration into the energy supply system and the use of a simple charging appliance.

A further improvement provides that the energy store comprises a capacitor as a further buffer element. The latter can supply energy faster than the lithium-ion accumulator. In this way, it is ensured that high electricity peaks can be covered almost without delay, making it possible to carry out the flash-butt welding with consistent quality.

In order to be able to use the combustion engine flexibly as a drive for additional units, it is advantageous if the generator can be operated as a generator and as an engine. In engine operation of the generator, it supports the combustion engine. A unit coupled to the combustion engine can thus, for example, be driven temporarily with an increased torque. During this, the energy for engine operation of the generator is provided by means of a power converter by discharging the energy store.

A drive train consisting of combustion engine, generator, connectible units and possibly coupling elements can also be powered entirely by means of the generator. This is useful for being able to operate security-related units even if the combustion engine fails. For example, it is possible to temporarily maintain a driving operation by means of the generator in engine operation in order to move a welding machine out of a danger area if the combustion engine has failed.

For high welding quality, it is advantageous if the welding converter is configured for converting an intermediate circuit voltage into an AC voltage with a frequency of approximately 1000 Hz. This results in a small structural size of a downstream welding transformer and a welding current with very low waviness.

A further advantageous embodiment provides that a hydraulic pump is coupled to the combustion engine in order to supply hydraulic components of the resistance welding machine. With this, for example, the hydraulic displacement of the assembly blocks takes place during a welding operation, wherein additional energy can be supplied from the energy store via the power converter and the generator in engine operation. This is advantageous particularly at the end of a welding operation, when the greatest forces must be applied during the so-called upset stroke.

A particularly simple structure of the energy supply system results if the energy store and the welding inverter are designed as plug-in modules of a switch cabinet. In this, it is moreover possible to expand the system, if needed, by means of additional energy store plug-in modules.

The method, according to the invention, for operation of an energy supply system as described above provides that the welding inverter is supplied with electrical energy from the energy store and/or by means of the power converter from the island grid, and that, if necessary, the island grid is supported with electrical energy from the energy store by means of the power converter. This indicates a flexible use of the energy supply system for different applications.

In a further development of the method, the generator is operated as an engine in order to increase the power that can be delivered by the combustion engine. In this manner, the energy stored in the accumulator is used to temporarily drive a unit, powered by the combustion engine, with higher output than the maximum output of the combustion engine.

BRIEF DESCRIPTION OF THE DRAWING

The invention will be described in an example below with reference to the attached FIGURE. The FIGURE shows in a schematic way an energy supply system for a mobile resistance welding machine for flash-butt welding of track rails with a power converter for controlled energy exchange between the island grid and intermediate circuit.

DESCRIPTION OF EMBODIMENTS

A generator 2 and a hydraulic pump 3 are coupled to a combustion engine 1 either directly or via coupling-, freewheel- or gearbox elements, not shown. Provided as combustion engine 1, for example, is a diesel engine having an engine output of about 100 kW. The generator 2 is an element of an island grid 4 which is configured, for example, as a three-pole three-phase mains supply. In addition to a charging device 5, the island grid 4 comprises, if necessary, further users 6, for example a machine control, a cooling unit, or a compressor.

Connected to the charging device 5 is an energy store 7. The latter advantageously comprises a lithium-ion accumulator 8 which—for easy inclusion in the energy supply system—is designed as an accu-pack with integrated charging circuit 9. Said charging circuit 9 includes the electronics required for the lithium-ion accumulators 8 and provides, via a data line 10, the required charging- and discharging parameters of the lithium-ion accumulator 8 to a controlled charging unit 11. In this, the charging unit 11 is designed as a simple switching power supply without a battery management system of its own.

Favourably, the energy store 7 also comprises a capacitor 12 which is designed, for instance, as a so-called supercapacitor (supercap). With this, a high energy requirement of short duration at the beginning of the flash-butt welding operation is covered.

The lithium-ion accumulator 8 and the capacitor 12 are arranged in parallel in an intermediate circuit 13 as buffer elements. Connected to the intermediate circuit 13 is a welding inverter 14 which chops an intermediate circuit voltage into an AC voltage having rectangular form and a frequency of about 1000 Hz. Downstream of the welding inverter 14 is a welding transformer 15 for transforming the AC voltage into the output voltage required for the welding operation. With this medium-frequency technology, a rectified welding current has particularly little waviness.

In this, it may be favourable to provide several welding inverters 14 switched in parallel, each having a downstream welding transformer 15. Then the individual appliances are of small structural size and need to be configured only for the particular partial current. A phase shift of the individual partial currents relative to one another furthermore reduces the waviness of the resulting welding current.

The energy supply system according to the invention includes a controlled power converter 16. A DC connector of the power converter 16 is connected to the intermediate circuit 13, and a three-phase current supply of the power converter 16 is connected to the island grid 4. An energy exchange between the island grid 4 and the intermediate circuit 13 takes place, if needed, by means of the power converter 16. To that end, the power converter 16 is designed as a frequency converter having suitable power semiconductor elements.

Arranged in the island grid are measuring devices 17, the measuring results of which are fed to a common control 18. For example, the measuring devices 17 comprise a voltage measuring circuit for detecting a voltage drop in the island grid 4. During this, the voltage in the island grid is constantly compared to a voltage threshold. As soon as the voltage threshold is fallen short of, the control 18 controls the power converter 16 in such a way that energy from the energy store 7 is fed back into the island grid 4.

This case may happen, for example, if the hydraulic pump 3, powered by the combustion engine, and the further users 6 consume more power than the maximum engine performance. This power difference is covered by the energy stored in the energy store 7. In this way, it is possible to operate the island grid for a short time in an overload range.

The energy fed into the island grid 4 by means of the power converter 16 can also be used to support the combustion engine 1 via the generator 2 in engine operation. Thus, the power deliverable at the combustion engine 1 (for example 150 kW) exceeds the maximum engine performance. During this, the generator designed as an asynchronous machine is controlled by means of the common control 18.

During the flash-butt welding of track rails, the upset stroke takes place at the end of the welding operation. In this, the assembly blocks of the welding machine are displaced towards one another with great force. The hydraulic pump 3 is able to temporarily supply a very high hydraulic pressure for this process step in that the performance deliverable at the combustion engine 1 is increased by means of the generator 2. Thus, the performance of the combustion engine 1 does not need to be configured for these load peaks. It is sufficient if the combustion engine 1 has enough power to sufficiently charge the energy store during a welding pause.

In this, the charging of the energy store 7 takes place by means of the charging device 5. When flash-butt welding track rails, a welding pause is usually sufficiently long to store in the energy store 7 enough energy for the next welding operation. A uniform load on the generator 2 and the combustion engine 1 is ensured without engine lugging.

During a welding operation, the energy stored in the energy store 7 is fed to the welding inverter 14. To that end, the welding inverter 14 is controlled by means of the common control 18. During this, electronics in the charging circuit 9 or in the charging unit 11 report to the control 18 continuously the charging state of the lithium-ion accumulator 8.

In regular operation, the energy store 7 is charged sufficiently during a welding pause so that subsequently at least one full welding operation can be carried out. During this, at first the current peaks at the start of flash-butt welding are covered, and during the finalizing upset stroke the combustion engine 1 is supported by means of the generator 2 in engine operation.

If, however, the energy stored in the capacitor 12 and in the lithium-ion accumulator 8 does not suffice to carry out an entire welding process, energy from the island grid 4 is fed to the intermediate circuit 13 by means of the power converter 16. For that purpose, the power converter 16 is designed as a bidirectional inverter. If needed, energy is retained in the energy store 7 to thereby support the combustion engine 1 during the finalizing upset stroke.

For booting up the energy supply system, it can be useful if contactors 19 are provided in the island grid 4 for initially switching off users 6. In this, controlling the contactors 19 takes place by means of the common control 18 in dependence upon a voltage building up. In addition, care must be taken to limit a charging current of the capacitor 12 during the booting-up. This may happen by sufficient internal resistance or by an active current limiting by means of the charging device 11 designed as a switching power supply.

Favourably, the individual components of the energy supply system are designed as plug-in modules of a switching cabinet. In this manner, a quick exchange of a faulty component is ensured. Furthermore, an accu-pack with different capacity can be used in a simple manner, if needed, or the system can be expanded by additional components.

The design of the energy supply system as an expanded island grid enables a container structure of the resistance welding machine, so that the same can be configured flexibly either as a stationary unit or as a superstructure on various vehicles.

The invention claimed is:

1. An energy supply system for a mobile resistance welding machine for flash-butt welding of track rails, comprising:
    a combustion engine;
    a generator;
    a charging device;
    an energy store;
    an intermediate circuit;
    a welding inverter;
    a controlled power converter;
    wherein the combustion engine is coupled to said generator, wherein the charging device configured to charge said energy store, wherein the charging device is connected to the generator, wherein the energy store is a buffer element of said intermediate circuit to which said welding inverter is connected, wherein the energy supply system comprises an island grid with further users to which the generator is connected and the island grid is additionally coupled to the intermediate circuit by means of said controlled power converter configured to exchange energy between the intermediate circuit and the island grid, wherein the welding inverter is configured to supply electrical power to the flash-butt welding.

2. The energy supply system according to claim 1, wherein the energy store comprises a lithium-ion accumulator.

3. The energy supply system according to claim 2, wherein the lithium-ion accumulator is designed as an accu-pack having an integrated charging circuit.

4. The energy supply system according to claim 1, wherein the energy store comprises a capacitor as a further buffer element.

5. The energy supply system according to claim 1, wherein the generator can be operated as a generator and as an engine.

6. The energy supply system according to claim 1, wherein the welding inverter is configured for converting an intermediate circuit voltage into an AC voltage with a frequency of approximately 1000 Hz.

7. The energy supply system according to claim 1, wherein a hydraulic pump is coupled to the combustion engine in order to supply hydraulic components of the resistance welding machine.

8. The energy supply system as in claim 1, wherein the further users comprise any one of a machine control, a cooling unit or a compressor.

9. The energy supply system as in claim 1, further comprising a data line and a common control, wherein the charging device is coupled to a charging circuit of the energy store via said data line and to said common control.

* * * * *